(12) United States Patent
Garg et al.

(10) Patent No.: US 8,073,959 B2
(45) Date of Patent: Dec. 6, 2011

(54) AUTOMATICALLY DETECTING WHETHER A COMPUTER IS CONNECTED TO A PUBLIC OR PRIVATE NETWORK

(75) Inventors: Neeraj Garg, Redmond, WA (US); Anatoliy Panasyuk, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 12/057,381

(22) Filed: Mar. 28, 2008

(65) Prior Publication Data

US 2009/0248840 A1    Oct. 1, 2009

(51) Int. Cl.
G06F 15/16 (2006.01)
G06F 15/177 (2006.01)
H04L 12/28 (2006.01)
H04L 29/06 (2006.01)

(52) U.S. Cl. ........ 709/228; 370/254; 709/220; 709/249; 713/155

(58) Field of Classification Search .................. 709/220, 709/228, 249; 370/254; 713/155
See application file for complete search history.

(56) References Cited

U.S. PATENT DOCUMENTS

| | | | |
|---|---|---|---|
| 5,392,449 A * | 2/1995 | Shaughnessy et al. | 455/8 |
| 5,459,761 A * | 10/1995 | Monica et al. | 375/211 |
| 5,818,824 A * | 10/1998 | Lu et al. | 370/328 |
| 6,687,243 B1 * | 2/2004 | Sayers et al. | 370/356 |
| 6,760,780 B1 * | 7/2004 | Chitturi et al. | 709/248 |
| 6,829,477 B1 * | 12/2004 | Lu et al. | 455/426.1 |
| 6,864,902 B2 * | 3/2005 | Keohane et al. | 715/739 |
| 6,944,167 B1 * | 9/2005 | McPherson | 370/401 |
| 6,978,317 B2 * | 12/2005 | Anantha et al. | 709/249 |
| 7,089,334 B2 | 8/2006 | Peshkin | |
| 7,284,267 B1 * | 10/2007 | McArdle et al. | 726/11 |
| 7,299,039 B2 * | 11/2007 | Lee et al. | 455/426.1 |
| 7,797,429 B2 * | 9/2010 | Liang et al. | 709/227 |
| 7,810,149 B2 * | 10/2010 | Islam et al. | 726/11 |
| 2002/0051226 A1 * | 5/2002 | Tanimoto | 358/443 |
| 2002/0138615 A1 * | 9/2002 | Schmeling | 709/225 |
| 2003/0217122 A1 | 11/2003 | Roese et al. | |
| 2003/0236865 A1 * | 12/2003 | Anthe et al. | 709/220 |
| 2004/0171369 A1 * | 9/2004 | Little et al. | 455/410 |
| 2004/0172531 A1 * | 9/2004 | Little et al. | 713/155 |
| 2004/0205205 A1 * | 10/2004 | Patterson | 709/229 |
| 2005/0009502 A1 * | 1/2005 | Little et al. | 455/411 |

(Continued)

OTHER PUBLICATIONS

Miu, et al., "Mobility between Public and Private Networks", USITS 2001 Paper, pp. 1-18.

(Continued)

*Primary Examiner* — Tonia L. M. Dollinger
*Assistant Examiner* — Daniel Murray

(57) ABSTRACT

Automatically detecting whether a local network that a computer is connected to is a public or private network by utilizing a trusted online service and/or heuristics is disclosed. Data produced as a result of performing one heuristic(s) in combination with data received from a trusted online service can be utilized to determine a level of confidence as to a type of network to which a client computer is connected. If the determined level of confidence exceeds a first level, the local network type for the client computer can automatically be set. If the determined level of confidence is less than the first level, but greater than a second level, a user can be prompted to classify the local network type with the determined local network type set as a default value. Techniques are also described for detecting whether or not two computers are connected to the same local area network.

13 Claims, 12 Drawing Sheets

U.S. PATENT DOCUMENTS

| | | | |
|---|---|---|---|
| 2005/0078624 A1* | 4/2005 | Shu et al. | 370/328 |
| 2005/0079882 A1* | 4/2005 | Lee et al. | 455/466 |
| 2005/0176413 A1* | 8/2005 | Lee et al. | 455/414.1 |
| 2005/0176420 A1* | 8/2005 | Graves et al. | 455/424 |
| 2005/0177647 A1* | 8/2005 | Anantha et al. | 709/249 |
| 2005/0229248 A1* | 10/2005 | Coley et al. | 726/21 |
| 2006/0095548 A1* | 5/2006 | Rabot et al. | 709/220 |
| 2006/0193323 A1* | 8/2006 | Lee | 370/392 |
| 2007/0027996 A1 | 2/2007 | Stewart | |
| 2007/0253395 A1* | 11/2007 | Graves et al. | 370/338 |
| 2007/0288656 A1* | 12/2007 | Liang et al. | 709/245 |
| 2007/0294755 A1* | 12/2007 | Dadhia et al. | 726/11 |
| 2008/0140775 A1* | 6/2008 | Lee et al. | 709/204 |
| 2008/0161011 A1* | 7/2008 | Babin et al. | 455/456.1 |
| 2010/0008260 A1* | 1/2010 | Kim et al. | 370/254 |
| 2011/0023105 A1* | 1/2011 | Islam et al. | 726/11 |

OTHER PUBLICATIONS

Balfanz, et al., "Network-in-a-Box: How to Set Up a Secure Wireless Network in Under a Minute", 13th USENIX Security Symposium—Technical Paper, '04 Paper, pp. 1-22.

Burns, et al., "Automatic Management of Network Security Policy", DARPA Information Survivability Conference & Exposition II, 2001, DISCEX apos;01, Proceedings, vol. 2, 2001, pp. 12-26.

Ahn, et al., "Security Policy Decision for Automation of Security Network Configuration", Publication Date: Sep. 21-24, 2003, vol. 3, pp. 1057-1061.

* cited by examiner

140

```
┌─────────────────────────────────────────────────────────────┐
│ CLIENT COMPUTER SENDS MESSAGE TO TRUSTED ONLINE SERVICE     │
│ WITH ITS OWN NETWORK ADDRESS AS CLIENT COMPUTER SEES        │
│ INSIDE THE MESSAGE                                          │
│ 142                                                         │
└─────────────────────────────────────────────────────────────┘
                              │
                              ▼
┌─────────────────────────────────────────────────────────────┐
│ NETWORK ADDRESS OF CLIENT COMPUTER AS SEEN BY TRUSTED       │
│ ONLINE SERVICE IS COMPARED WITH NETWORK ADDRESS AS SEEN     │
│ BY CLIENT COMPUTER                                          │
│ 144                                                         │
└─────────────────────────────────────────────────────────────┘
                              │
                              ▼
┌─────────────────────────────────────────────────────────────┐
│ IF NETWORK ADDRESS IS SAME THEN CLIENT COMPUTER IS LOCATED  │
│ BEHIND PUBLIC NETWORK                                       │
│ 146                                                         │
└─────────────────────────────────────────────────────────────┘
                              │
                              ▼
┌─────────────────────────────────────────────────────────────┐
│ IF NETWORK ADDRESSES NOT SAME THEN CLIENT COMPUTER MAY BE   │
│ CONSIDERED TO BE ON PRIVATE NETWORK                         │
│ 148                                                         │
└─────────────────────────────────────────────────────────────┘
```

```
┌─────────────────────────────────────────────────────────────┐
│ IF DEFINITE ANSWER THEN MAKE AUTOMATIC DETERMINATION        │
│                          252                                │
└─────────────────────────────────────────────────────────────┘
                              │
                              ▼
┌─────────────────────────────────────────────────────────────┐
│ IF 'LIKELY' ANSWER THEN PROMPT USER WITH DEFAULT ANSWER     │
│                          254                                │
└─────────────────────────────────────────────────────────────┘
                              │
                              ▼
┌─────────────────────────────────────────────────────────────┐
│ IF NO ANSWER THEN PROMPT USER WITH NO DEFAULT               │
│                          256                                │
└─────────────────────────────────────────────────────────────┘
```

FIG. 9

AUTOMATICALLY DETECTING WHETHER A COMPUTER IS CONNECTED TO A PUBLIC OR PRIVATE NETWORK

BACKGROUND

The Internet has made large amounts of information available to computer users. For many users, access to this information has become essential. Yet connecting a private network to the Internet can expose critical data to attack from anywhere in the world. Users who connect a computer to the Internet need to be aware of these dangers and how to protect their data and systems. Many users set up a firewall to help monitor and defend their computer from Internet attacks. However, configuring appropriate firewall security settings can be difficult for some users.

Some applications allow a user to select different firewall security settings for public vs. private networks. When a new connection is detected, the firewall software will typically prompt the user to specify whether it is a private or public network. The firewall software then configures the firewall to low or high security based on the user's response.

The ability for a user to manually specify a local network type is certainly useful, but it relies on the user to make the correct determination whether the network is private or public. Unfortunately, incorrect classification leads to either an insecure system that can be attacked or to valuable features or services being blocked by the firewall.

SUMMARY

Various technologies and techniques are disclosed for automatically detecting whether a computer is connected to a public or private network. Data is received from a trusted online service to help determine a local network type to which a client computer is connected. The data is analyzed to generate an answer as to the local network type that the client computer is connected to. In one implementation, heuristics can be analyzed in addition to information from the trusted online service to help determine the local network type. When a definite answer regarding the local network type can be determined from analyzing the data, then the local network type is automatically set for the client computer.

In another implementation, technologies and techniques are described for detecting whether two computers are connected to the same local area network (LAN) or not. Trace route information is received from a first client computer and from a second client computer. The trace route information and/or other information from the first client computer and the second client computer are analyzed to generate a merged view. The merged view is further analyzed so a determination can be made as to whether or not the first client computer and the second client computer are located on a same local area network.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 is a process flow diagram of one implementation illustrating the stages involved in comparing network addresses as seen by the client computer and a trusted online service to help determine local network type.

FIG. 9 is a process flow diagram that illustrates one implementation of the stages involved in analyzing data previously gathered to help determine local network type.

DETAILED DESCRIPTION

The technologies and techniques herein may be described in the general context as a firewall application that programmatically detects whether a computer is connected to a public or private network, but the technologies and techniques also serve other purposes in addition to these. In one implementation, one or more of the techniques described herein can be implemented as features within a firewall program such as Network Location Awareness (NLA) in MICROSOFT® WINDOWS® Vista, or from any other type of program or service that provides security and/or firewall capabilities for computers or provide logic to adapt application behavior based on the type of local network.

Figure 1:
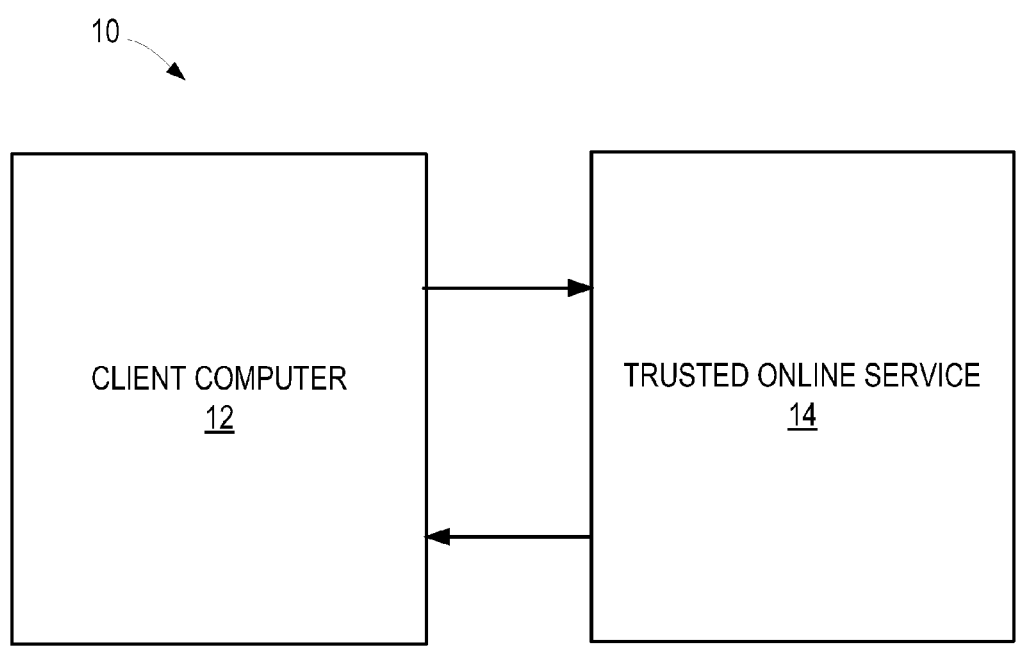
FIG. 1 is a diagrammatic view of FIG. 1 is a diagrammatic view of a network topology detection system of one implementation.

FIG. 1 is a diagrammatic view of a network topology detection system 10 of one implementation. Client computer 12 communicates with trusted online service 14 in determining whether or not the local network that client computer 12 is connected to is a public network or a private network. The term "local network" as used herein is meant to include a set of computers that are logically or physically close by. The term "private network" as used herein is meant to include a network that only contains devices that are trusted by an administrator of a device being protected. The term "public network" as used herein is meant to include any network which is not a private network as defined above. The term "client computer" as used herein is meant to include one of various types of computing devices, such as a laptop, desktop computer, mobile device, or personal digital assistant that can receive communications from other devices over a network. The term "trusted online service" as used herein is meant to include a server or other computer that is trusted by client computer and capable of communicating with client computer.

Trusted online service can be provided by a different entity than the one utilizing the client computer, or by the same entity as the one utilizing client computer. In one implementation, the trusted online service 14 provides additional data to client computer 12 to help client computer 12 make a determination as to the type of local network that client computer is on. The additional data provided by trusted online service 14 can be utilized in combination with one or more heuristics to make a local network type determination. Once the network determination is made, this information can be utilized by one or more software applications on the client computer 12 for one or more purposes. As one non-limiting example, the type of network can be set in the firewall software on the client computer 12 to help client computer 12 protect the machine from unauthorized access or other firewall-related problems. As another non-limiting example, other applications can adapt their behavior based upon whether or not the client computer 12 is on a private network or not. For example, a media player application may broadcast its presence to other devices on the network when the network is private, but not when the network is public. These techniques for determining a local network type are described in further detail in FIGS. 3-9.

Turning now to FIGS. 2-11, the stages for implementing one or more implementations of the technologies and techniques herein are described in further detail. In some implementations, the processes of FIGS. 2-11 are at least partially implemented in the operating logic of computing device 500 (of FIG. 12).

Figure 2:
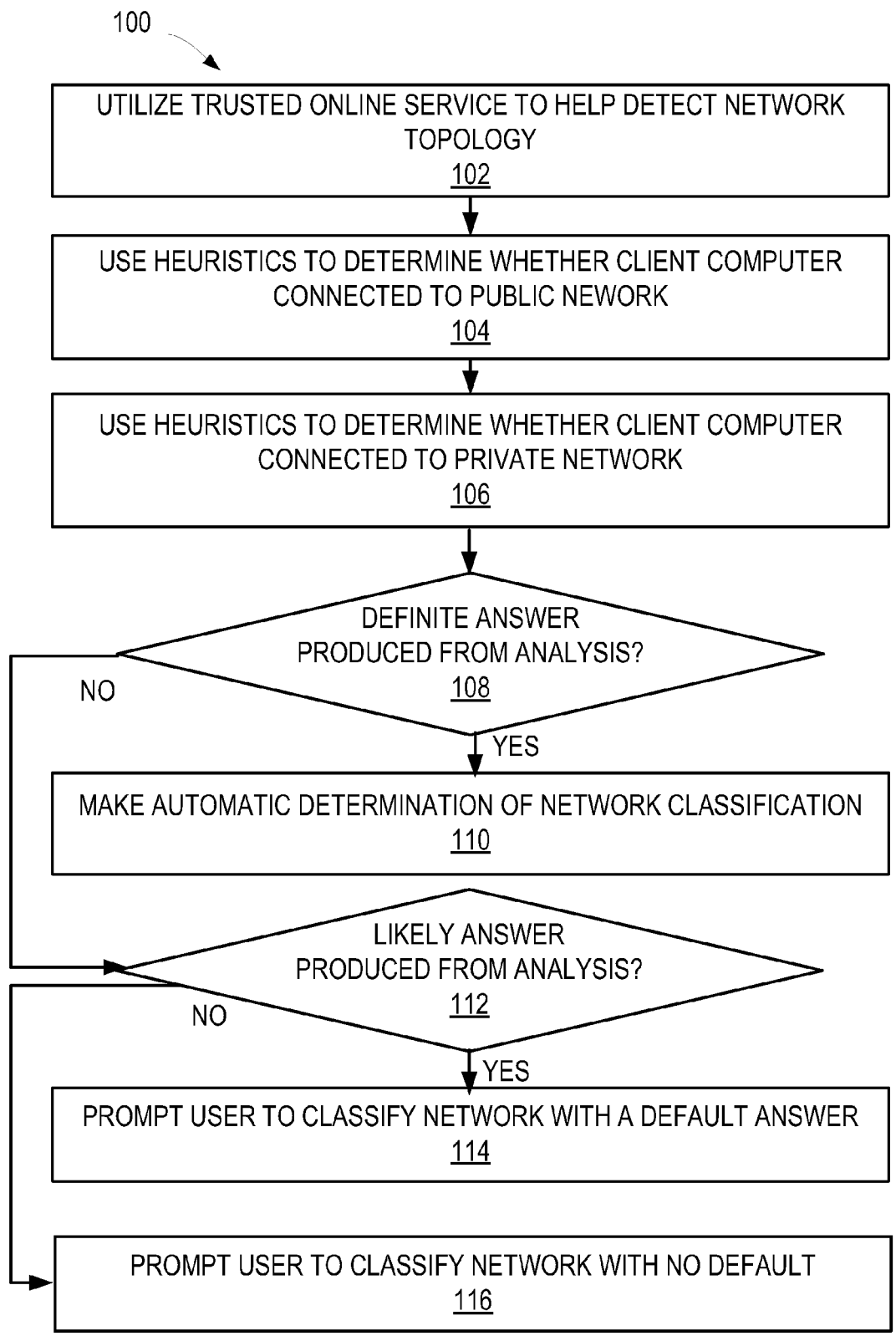
FIG. 2 is a high-level process flow diagram for one implementation that illustrates the stages involved in determining whether a local network to which a computer is connected is a public or private network.

FIG. 2 is a high-level process flow diagram 100 that illustrates one implementation of the stages involved in determining whether the local network to which client computer 12 is connected is a public or private network.

Trusted online service is utilized to help make a decision as to whether or not a client computer is directly connected to a public network or is behind a private network (such as a Network Address Translation [NAT] private network) (stage 102). NAT is a networking protocol that allows a network of private IP addresses to be set up using a single real IP address. For a computer to communicate with other computers and web servers on the Internet, it needs a network address. A network address is a unique identifier that identifies the location of a computer on a network as per the network protocol being used. Basically, a network address works like a street address. However, when using NAT, a local area network (LAN) can be set up with no special configuration of the Internet connection. To the devices outside the LAN, the private network looks like one computer, but on the LAN, each computer has its own internal network address.

One or more heuristics can be used in addition to or instead of trusted online service to help determine whether client computer is connected to a public network (stage 104) or a private network (stage 106). If a definite answer as to whether the network is a private network or a public network can be discerned from the previous analysis (decision point 108), then a programmatic determination is made of the network classification. That programmatic determination can then be set in the software of the client computer. If, however, a definite answer cannot be discerned (decision point 108), but a likely answer was produced from the analysis (decision point 112), then the user is prompted to classify the network, while being provided with a default or suggested answer (stage 114). If neither a definite answer (decision point 108) nor a likely answer (decision point 112) can be discerned from the prior analysis, then the user is prompted to classify the local network type without being given a default suggestion (stage 116). The stages of FIG. 2 are just one example of how local network types can be determined programmatically and/or with user assistance. For example, in another implementation, the user may be prompted to confirm that the programmatic determination is acceptable, even when a definite answer was produced. Each of these exemplary steps is discussed in greater detail in FIGS. 3-9.

Figure 3:
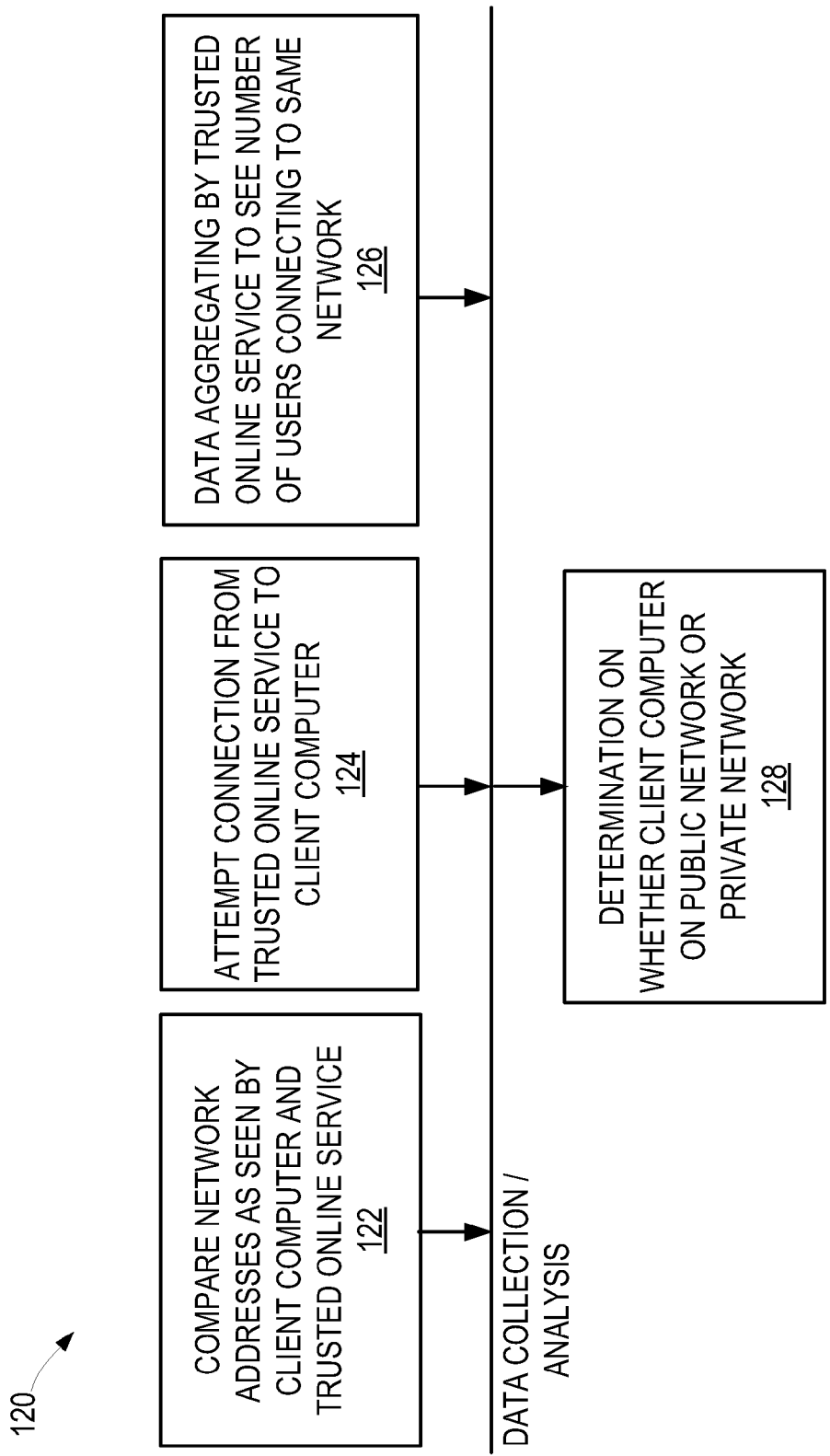
FIG. 3 is a diagrammatic view of some exemplary data collection steps and/or tests that can be performed to determine whether a local network to which a computer is connected to is a public or private network.

FIG. 3 is a diagrammatic view of some exemplary data collection steps and/or tests that can be performed to determine whether the local network that a computer is connected to is a public or private network. As described in further detail in FIG. 4, the network addresses as seen by the client computer and the trusted online service can be compared to help determine whether the network is private or public (stage 122). As described in further detail in FIG. 5, the trusted online service can attempt to connect to client computer to help determine whether the network is private or public (stage 124). As described in further detail in FIG. 6, data aggregating can be performed by the trusted online service to track the number of users connecting to the same network and to use that data to help determine whether the network of the client computer is private or public (stage 126). Once the data and/or tests have been performed, a determination can then be made with a certain level of confidence as to whether or not the client computer is on a public network or a private network (e.g. behind a NAT) (stage 128). Each of these techniques will now be discussed in further detail.

FIG. 4 is a process flow diagram 140 of one implementation illustrating the stages involved in comparing network addresses as seen by the client computer and a trusted online service to help determine local network type. The client computer sends a message to the trusted online service with a network address of the client computer (stage 142). In other words, the client computer sends a message with the network address it sees internally inside the message to the trusted online service. A packet is a formatted block of information carried by a computer network carrying the information that will help get to its destination including the sender's network address and the intended receiver's network address.

The network address as the trusted online service sees the client computer is compared with the network address as seen by the client computer (stage 144). The comparison can be performed by the trusted online service, or the comparison can be made by the client computer. In the latter case, the trusted online service responds back with the network address that the trusted online service saw on the envelope of the packet received. In either implementation, if the network address that the client computer sends to the trusted online service inside the message is the same as the network address that the trusted online services sees of the client computer, then the client computer is located behind a public network (stage 146). If the network address that the client computer sends to the trusted online services is not the same as the network address that the trusted online service sees of the client computer, then the client computer may be located on a private network (stage 148).

Figure 5:
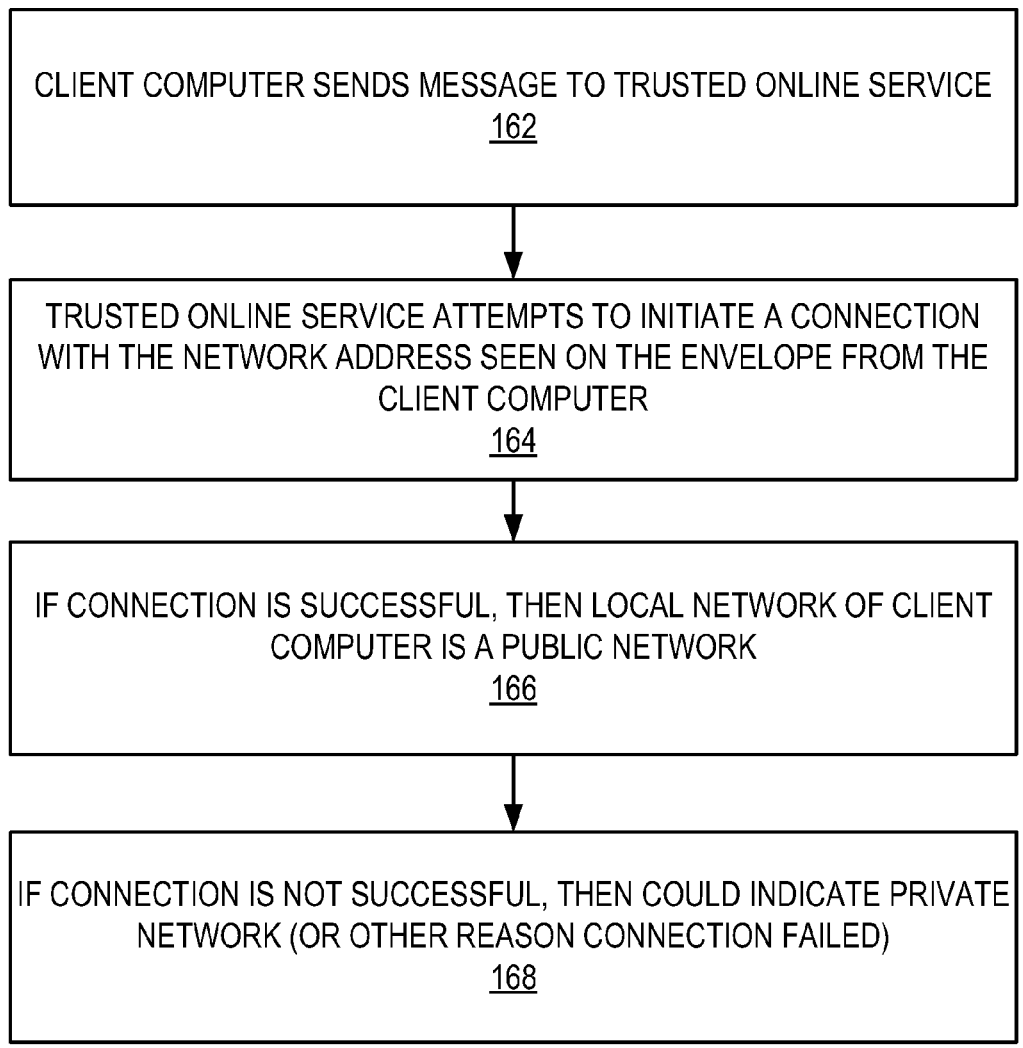
FIG. 5 is a process flow diagram of one implementation illustrating the stages involved in the trusted online service attempting to connect to the client to help determine local network type.

FIG. 5 is a process flow diagram 160 of one implementation illustrating the stages involved in the trusted online service attempting to connect to the client to help determine local network type. The client computer sends a message to the trusted online service (stage 162). The trusted online service attempts to initiate a connection with network address (IP address, etc.) seen on the envelope of the message from the client computer (stage 164) using the sender address on the envelope that it received. If the trusted online service is able to successfully connect to the client computer, then the local network of the client computer is a public network (stage 166). If the connection is not successful, then this could indicate a private network is being used, or it could indicate there was another reason the connection failed (such as a communication error) (stage 168). In other words, just because the connection from trusted online service to client computer is not successful, it does not automatically mean that the client computer is located on a public network.

Figure 6:
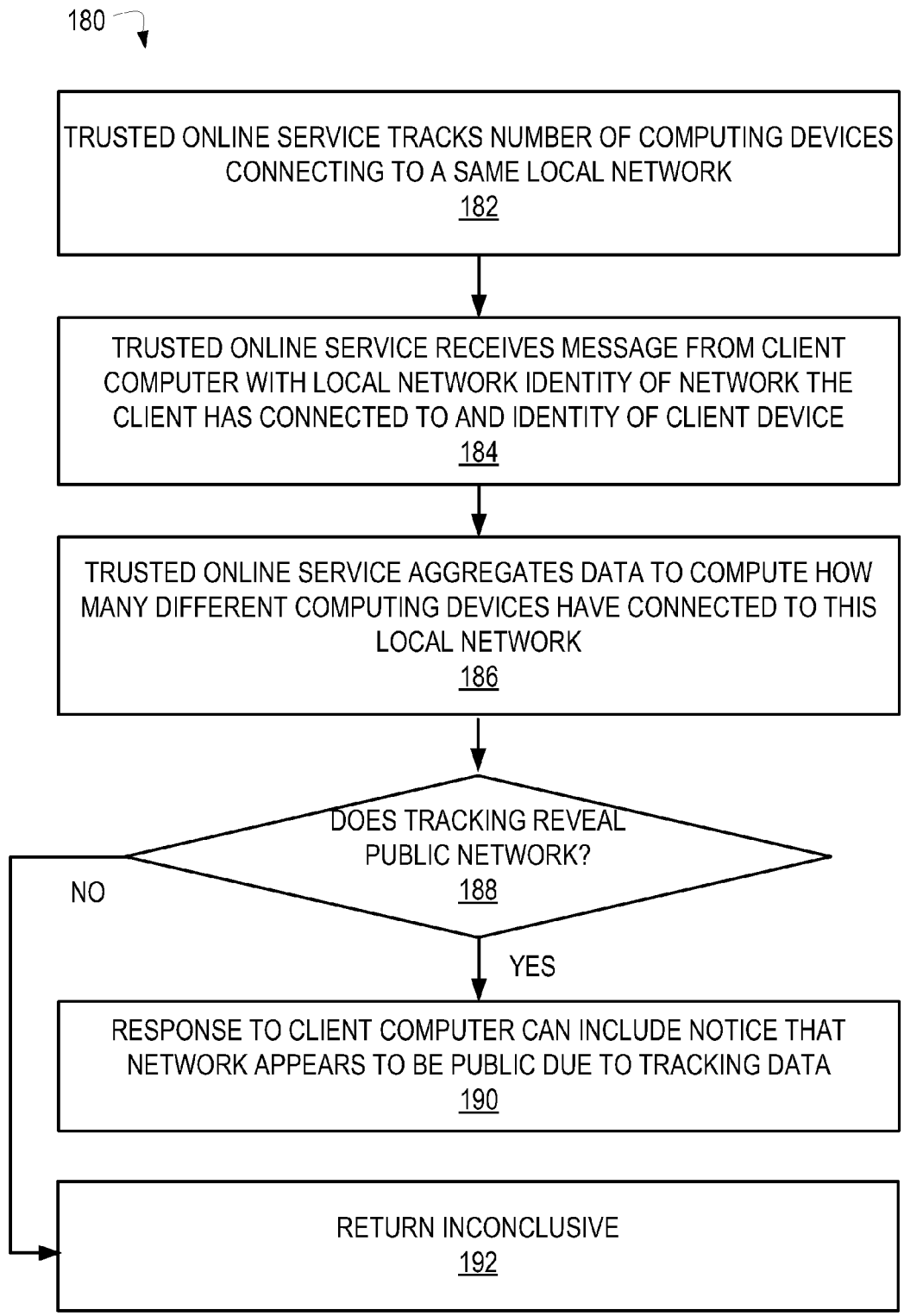
FIG. 6 is a process flow diagram for one implementation illustrating the stages involved in tracking the number of computers connected to the same network to help determine local network type.

FIG. 6 is a process flow diagram 180 for one implementation illustrating the stages involved in tracking the number of computers connected to the same network to help determine local network type. Over a period of time, the trusted online service tracks the number of computing devices connecting to the same local network where network is considered same for the computing devices if their "network identity" is the same (stage 182). There are many schemes to compute the network identity. The network identity can be constructed based upon one or more attributes of that network. Here are several non-limiting examples. For ethernet based networks, the network identity can be the MAC address of the default gateway. For some domain-authenticated networks, the network identity could be the fully qualified domain name of the network. For authenticate IP, the network identity could be based on the certificate used to establish an authenticated IP. For narrowband networks, the network identity could be the name of the service provider.

The trusted online service then receives the message from the client computer with the local network identity of the network it has connected to as well as the identity of the client device (stage 184). A local identity of a network can be determined by one of various techniques, such as the MAC address of the DHCP server that issued the IP address, the domain name for a domain authenticated network, or certificate/secrets used to connect to a secure network, to name a few examples. A computing device identity can be determined by considering one or more characteristics such as the name of the computer on the network, the MAC address of the network card on the router, an identifier issued by the trusted online service to connect to it, and/or an identifier issued by the network authority managing the network, to name a few non-limiting examples.

The trusted online service aggregates the data across multiple devices to compute whether the usage patterns of devices or users connecting to the network indicates that it is a publically used network. For example, for a consumer scenario if the network has seen more than fifty unique devices connect to it ever, it is probably not a home router. Similarly, we can use the number of concurrent sessions, length of sessions etc to compute. The trusted online service responds back with the aggregate data across multiple devices to the client computer. If the tracking of data regarding other computers reveals that this network is a public network (decision point 188), then the trusted online service can include a notice or other indication in the response back to the client that the network appears to be public due to the tracking data (stage 190).

In one implementation, the trusted online service determines whether the number of different computing devices connecting to this local network is beyond the threshold for private networks as established by the trusted online service or the client computer. If the threshold is exceeded, then the local network is considered public. In an alternate implementation, trusted online service sends the aggregated data back to the client e.g. how many unique devices have connected with this network and the client makes the determination based on local policy. If the tracking of data regarding other computers does not reveal that this local network is a public network (decision point 188), then the return is inconclusive (stage 192).

It will be appreciated that the examples discussed in FIGS. 4-6 for utilizing the trusted online service to provide additional data and/or tests on the type of network being utilized by client computer can be performed simultaneously with each other, separately from each other, or in some cases, not performed at all. These tests and analysis were described separately for the sake of illustration.

Figure 7:
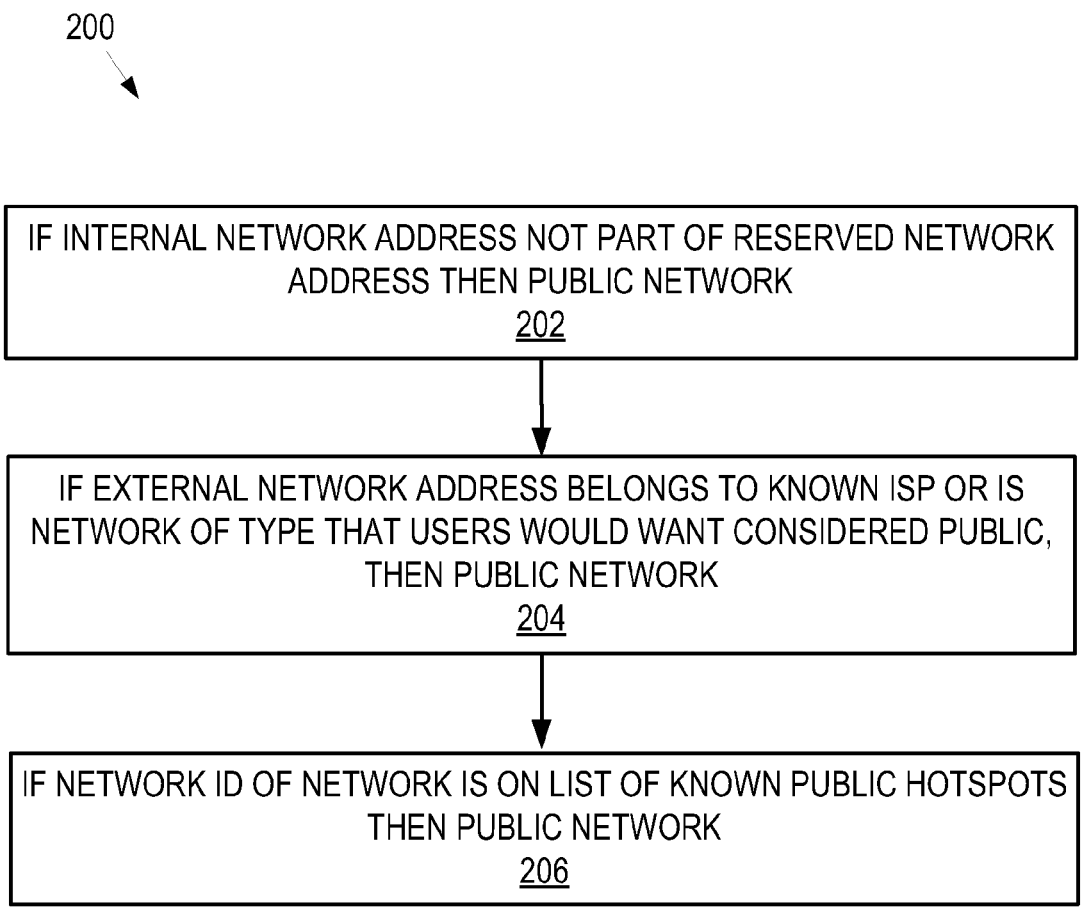
FIG. 7 is a process flow diagram that illustrates one implementation of the stages involved in using heuristics to determine whether the local network that the client computer is connected to is a public network.

FIG. 7 is a process flow diagram 200 that illustrates one implementation of the stages involved in using heuristics to help determine whether the local network that the client computer is connected to is a public network. If the internal network address of the client computer is not part of network addresses reserved for special address ranges reserved by the communication protocols for non global communication network addresses, then the client computer is connected to a public network (stage 202). An exception to this can be entities that use public range IP addresses but are still behind a NAT. The term "private network address" as used herein is meant to include a privately used network address that is not usable for global communication. A few non-limiting examples of private IP addresses can include IP addresses based upon IPv4 and IPv6 references.

If the external network address belongs to a known ISP or network that is used or deployed in a fashion such that users will want local network of devices connected to be considered public, then the client is connected to a public network (stage 204). Examples of this can include wireless networks provided by cellular phone providers, city wide wireless provided by ISP or cities, WiMax networks etc.

A wireless-enabled device such as a laptop can connect to the Internet when the laptop is within range of a wireless network connected to the Internet. If the network ID of the network is on the list of the known public HotSpots (such as Municipal WiFi), then the client computer is connected to a public network (stage 206). Municipal WiFi (or Muni WiFi) is the concept of turning an entire city into a wireless access zone by providing wireless broadband to residents. Hotspots are WiFi zones found in restaurants and public places that allow users to connect to the Internet. In one implementation, the trusted online service does the network ID database lookup of known public addresses. While the examples, above refer to wireless network, the approach is also applicable to wired networks as long as a unique identity can be computed regardless of the actual medium of connection. In another implementation, the client computer performs the network ID database lookup of known public network identities.

Figure 8:
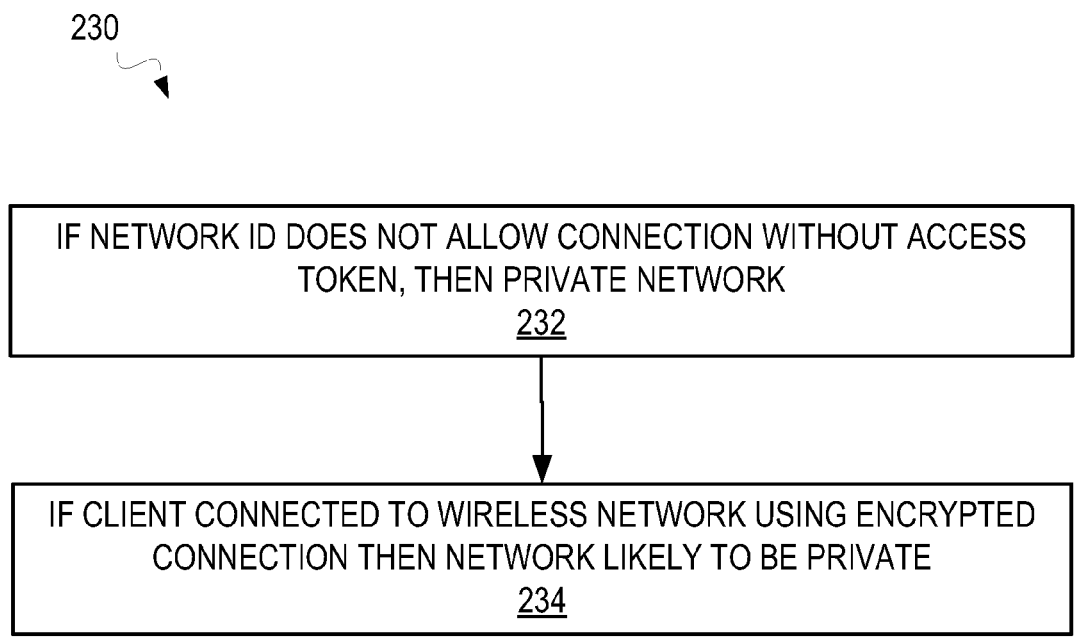
FIG. 8 is a process flow diagram that illustrates one implementation of the stages involved in using heuristics to determine whether the local network that the client computer is connected to is a private network.

In one implementation, if one of the tests described in FIG. 7 reveal that the network that the client computer is connected to is a public network, then the steps described in FIG. 8 do not need to be performed to see if the network has characteristics of a private network. Alternatively or additionally, the steps of FIG. 8 to analyze whether the network has characteristics of a private network could be performed first, and then if that determination is not conclusive, then the steps of FIG. 7 could be performed. As noted earlier, these heuristics can be performed instead of, or in combination with the trusted online service analysis and tests described in FIGS. 3-6.

FIG. 8 is a process flow diagram 230 that illustrates one implementation of the stages involved in using heuristics to determine whether the local network that the client computer is connected to is a private network.

If the network does not allow connection without presenting an access token, and if access token is considered secure enough, the network could be considered private (stage 232). As one non-limiting example, the WiFi security feature of MICROSOFT® WINDOWS® Live OneCare detects when the user is connected to an unsecured wireless network. The user is presented with an action item. When the action item is executed, OneCare communicates directly with the router and turns on WEP128 security. Wired Equivalent Privacy (WEP) is a security protocol for wireless networks that encrypts data. Using OneCare as a non-limiting example, WEP encrypts the data portion of each packet exchanged on the 802.11b network using a 128-bit encryption algorithm.

If the client computer is connected to the wireless network using an encrypted (WPA/WEP) connection, the network is likely to be private (stage 234). WiFi Protected Access (WPA) is an improved form of encryption for wireless data meant to replace WEP.

FIG. 9 is a process flow diagram 250 that illustrates one implementation of the stages involved in determining local network type. If the analysis and/or tests conducted with the trusted online services and/or the heuristics described herein produced a definite answer (private or public), then an automatic determination can be made programmatically without asking the user (stage 252). In one implementation, the user will be notified even if not asked.

If the above heuristics sequence produced a likely answer (e.g. the network is likely to be private), then the user is prompted to classify the network as private/public network, with a default value being set to the most likely classification based on automatic detection (stage 254). If automatic classification is undetermined, then the user is prompted to classify the network without any default (stage 256).

Figure 10:
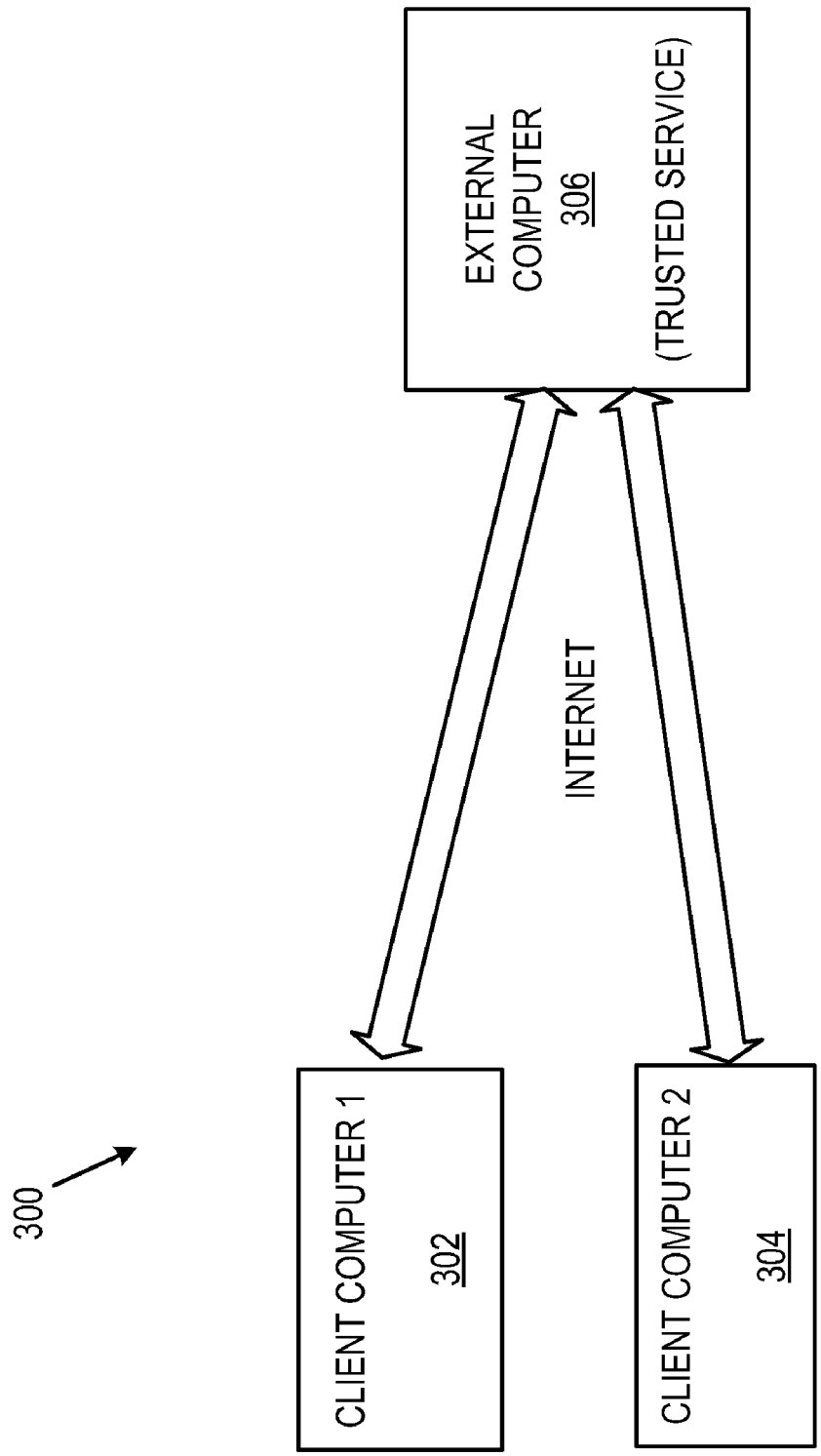
FIG. 10 is a diagrammatic view of a LAN detection system of one implementation.
Figure 11:
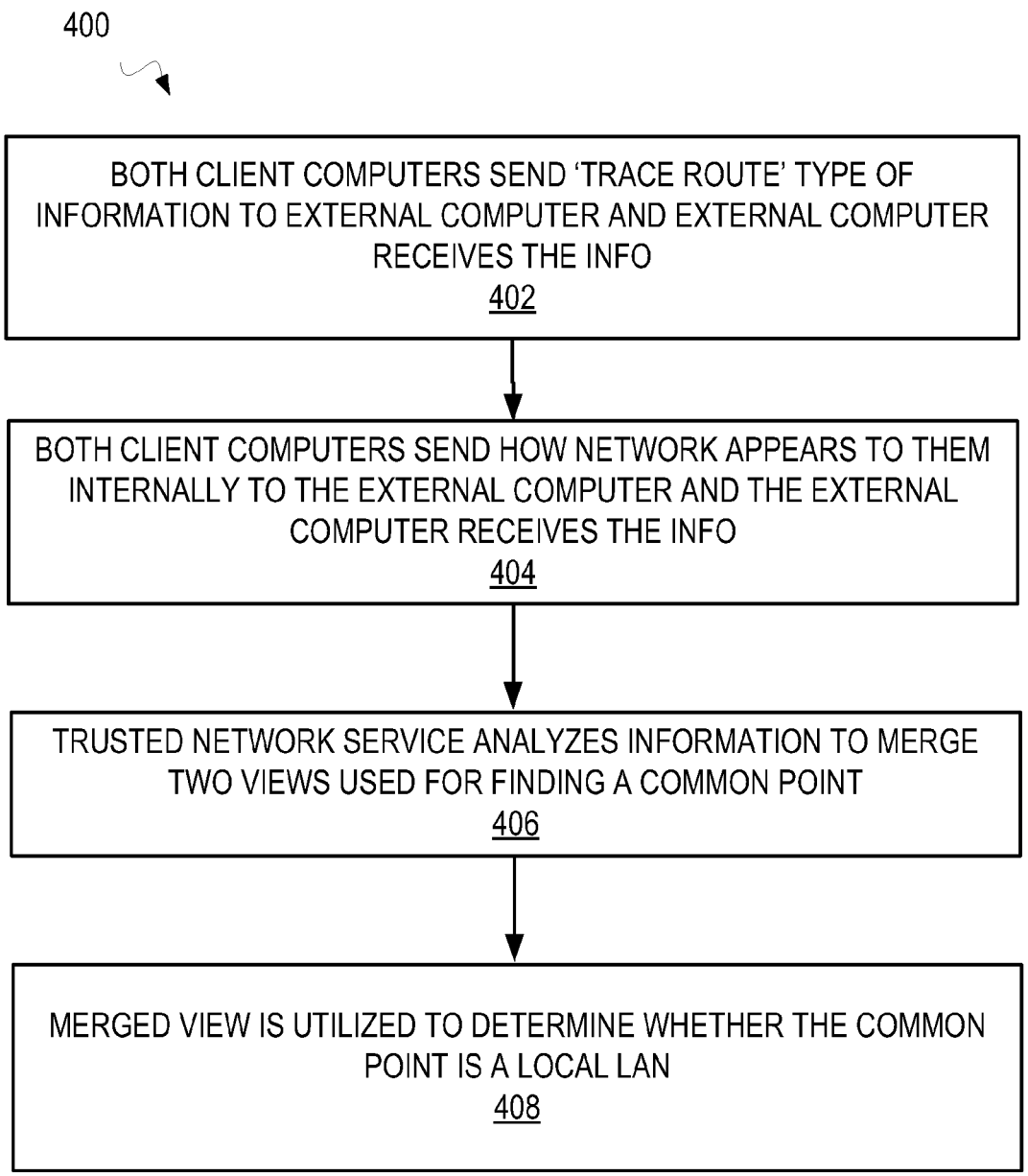
FIG. 11 is a process flow diagram that illustrates one implementation of the stages involved in determining whether or not two computers are connected to the same LAN.

Turning now to FIGS. 10 and 11, a LAN detection system for helping determine whether two computers are on a same LAN is described. FIG. 10 is a diagrammatic view of a LAN detection system 300 of one implementation. Client computer 1 (302) and client computer 2 (304) utilize external computer 306 via the Internet to determine whether the two client computers (302 and 304) are on the same LAN. In one implementation, external computer 306 is a trusted service, such as trusted online service 14 described in earlier figures. The communication steps for utilizing external computer 306 to help make this determination are shown in more detail in FIG. 11.

FIG. 11 is a process flow diagram 400 that illustrates one implementation of the stages involved in determining whether two computers that belong to the same trusted 'circle' are connected to the same LAN or not. In one implementation, it is useful to know whether computers are connected to the same LAN or not for utilizing point to point communications between the two computers.

Both client computers send trace route information to the external computer (stage 402). A "trace route" is a computer network tool that can be used to determine the route taken by packets across an IP network. Trace route information thus includes details about the path taken by the packets across the network in reaching their destination. Alternatively or additionally to sending the trace route information, both client computers send data to the external computer relating to how the network appears to each of them internally (stage 404) (also called "internal network appearance information"). This internal network appearance information can include the network address as each computer sees it.

External computer 306 analyzes information received to merge the two views to find the common point (stage 406). The merged view is utilized to determine whether or not the common point is a local LAN (stage 408). In one implementation, to make the determination, the external computer forwards the raw information to the clients, and the clients analyze the information received from the external computer to deduce the common point and whether the common point is within what they will consider the local LAN (stage 408). In other words, both client computers should have the same network details for an internal network, or the same information at some point that the network is still private (this is what is meant by "common point"). In another implementation, the online service can interpret the merged view and send the results to one or more of the client computers. Once that common point is determined, then an analysis can be performed on whether or not that common point is considered a local LAN or not.

As a non-limiting example, in a home environment, suppose client computer 1 and client computer 2 consider each other on the same LAN if they are directly behind the same router. Client computer 1 and client computer 2 each send a message to the external computer containing: trace route information, internal IP address of the client computer, and the default gateway's IP address as well as MAC address.

Using the above non-limiting example, external computer 306 concludes that client computers 1 and 2 are on the same LAN if all of three following outcomes are true. First, the default gateway IP address and MAC address received is same for both client computer 1 and client computer 2. Second, client computer 1 and client computer 2 have internal IP addresses within the private IP segments (e.g. 192.168.*.*). Third, the external IP address as seen by external computer 306 for both client computer 1 and client computer 2 are the same. If all of the above are true, then client computer 1 and client computer 2 are considered to be on the same LAN.

Figure 12:
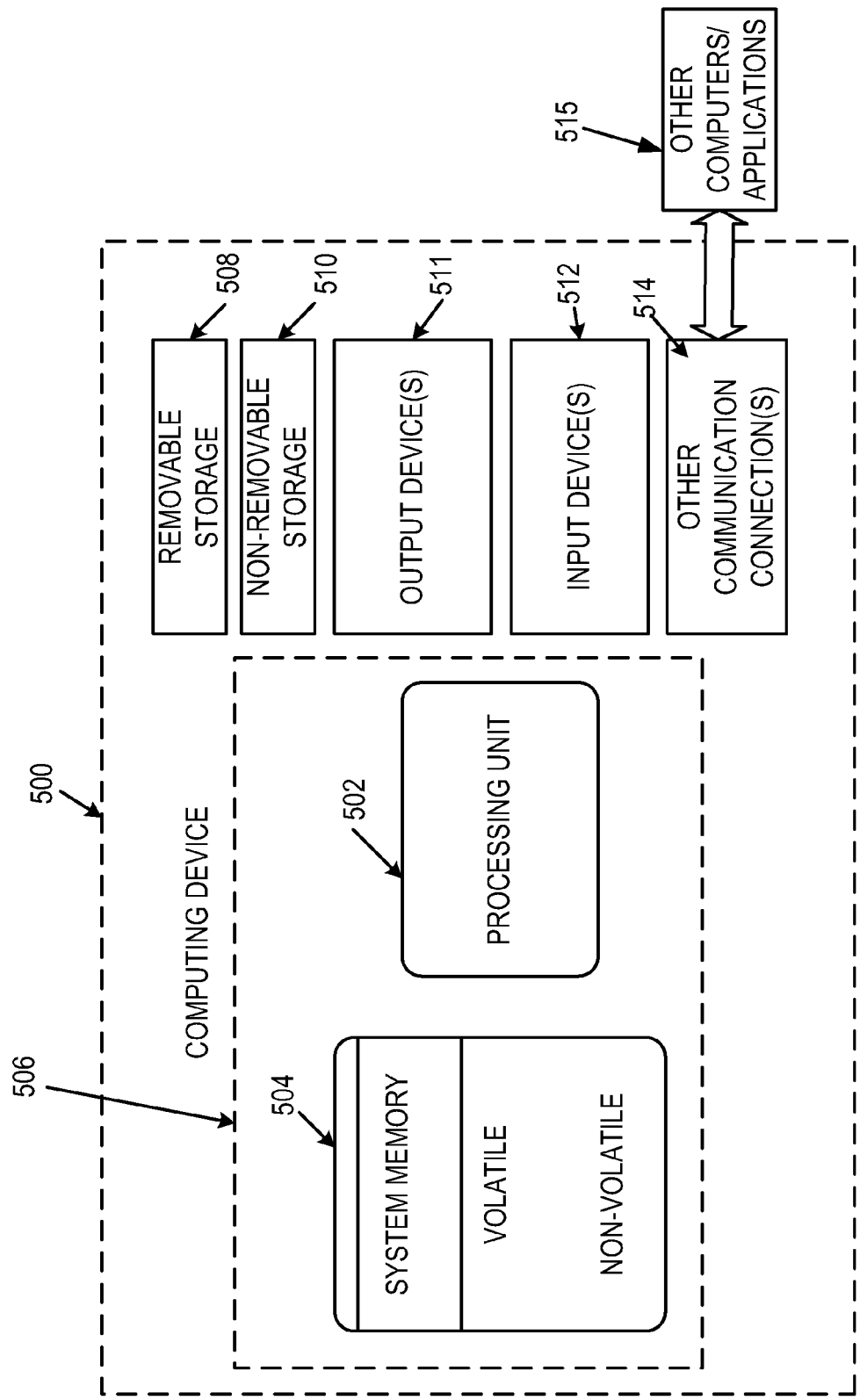
FIG. 12 is a diagrammatic view of a computer system of one implementation.

As shown in FIG. 12, an exemplary computer system to use for implementing one or more parts of the system includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 12 by dashed line 506.

Additionally, device 500 may also have additional features/functionality. For example, device 500 may also include additional storage (removable and/or non-removable) including, but not limited to, magnetic or optical disks or tape. Such additional storage is illustrated in FIG. 12 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Any such computer storage media may be part of device 500.

Computing device 500 includes one or more communication connections 514 that allow computing device 500 to communicate with other computers/applications 515. Device 500 may also have input device(s) 512 such as keyboard, mouse, pen, voice input device, touch input device, etc. Output device(s) 511 such as a display, speakers, printer, etc. may also be included. These devices are well known in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A hardware computer storage medium having computer-executable instructions for causing a computer to perform steps comprising:
    receiving data from a trusted online service to assist in determining whether a client computer is connected to a public network or a private network, the data comprising a network address of the client computer as seen by the trusted online service;
    sending a message to the trusted online service, the message comprising an envelope with a network address seen by the client computer;
    attempting to initiate a connection with the network address as seen by the client computer, and, if the connection is successful, determining that the client computer is connected to a public network;
    tracking by the trusted online service a number of computing devices connecting to a same local network as the client computer;
    determining by the trusted online service whether the number of computing devices connecting to the same local network as the client computer exceed a pre-established threshold for private networks, and, if the number of computing devices connecting to the same local network as the client computer exceed the pre-established threshold for private networks, determining that the client computer is connected to a public network;
    analyzing the data to determine whether the client computer is connected to a public network or a private network, analyzing comprising comparing the network address of the client computer as seen by the trusted online service with the network address of the client computer as seen by the client computer, if the network address of the client computer as seen by the trusted online service and the network address of the client computer as seen by the client computer are the same, determining that the client is connected to a public network;
    if the client computer is not determined to be connected to a public network, then determining that the client computer is connected to a private network; and
    automatically setting a local network type for a firewall of the client computer as connected to a public network, if the client computer is determined to be connected to a public network or as connected to a private network, if the client computer is not determined to be connected to a public network.

2. The hardware computer storage medium of claim 1, further having computer-executable instructions for causing a computer to perform steps comprising:
    using results of one or more heuristics to determine whether the client computer is connected to a private network or a public network.

3. The hardware computer storage medium of claim 2, wherein the heuristics are directed at least in part to determining whether the client computer is connected to a public network.

4. The hardware computer storage medium of claim 2, wherein the heuristics are directed at least in part to determining whether the client computer is connected to a private network.

5. The hardware computer storage medium of claim 1, further having computer-executable instructions for causing a computer to perform steps comprising:
    when the local network type can be determined from analyzing the data, then prompting a user to classify the local network type with the determined local network type set as a default value.

6. The hardware computer storage medium of claim 1, wherein the data from the trusted online services includes information regarding whether an attempt by the trusted online service to connect directly to the client computer was successful.

7. The computer storage medium of claim 1, wherein the data from the trusted online service includes usage patterns of devices or users connecting to a network that the client computer is connected to.

8. A method for utilizing heuristics in combination with a trusted online service to determine a local network type to which a client computer is connected comprising the steps of:
    receiving data from a trusted online service to assist in determining whether a client computer is connected to a public network or a private network, the data comprising a network address of the client computer as seen by the trusted online service;
    sending a message to the trusted online service, the message comprising an envelope with a network address seen by the client computer;
    attempting to initiate a connection with the network address as seen by the client computer, and, if the connection is successful, determining that the client computer is connected to a public network;
    tracking by the trusted online service a number of computing devices connecting to a same local network as the client computer;
    determining by the trusted online service whether the number of computing devices connecting to the same local network as the client computer exceed a pre-established threshold for private networks, and, if the number of computing devices connecting to the same local network as the client computer exceed the pre-established threshold for private networks, determining that the client computer is connected to a public network;
    analyzing the data to determine whether the client computer is connected to a public network or a private network, analyzing comprising comparing the network address of the client computer as seen by the trusted online service with the network address of the client computer as seen by the client computer, if the network address of the client computer as seen by the trusted online service and the network address of the client computer as seen by the client computer are the same, determining that the client is connected to a public network;

if the client computer is not determined to be connected to a public network, then determining that the client computer is connected to a private network; and automatically setting a local network type for a firewall of the client computer as connected to a public network, if the client computer is determined to be connected to a public network or as connected to a private network, if the client computer is not determined to be connected to a public network.

9. The method of claim 1, wherein when an internal network address of the client computer is not part of a reserved network address range, then the local network type is a public network.

10. The method of claim 1, wherein when an external network address belongs to a known network then the local network type is a public network.

11. The method of claim 1, wherein when a network ID of a wireless network that the client computer is connected to is on a list of known public hotspots, then the local network type is a public network.

12. The method of claim 1, wherein when a network ID of the client computer matches a secured network ID, then the client computer is connected to a private network.

13. The method of claim 1, wherein when the client computer is connected directly to a wireless network using an encrypted connection, then the local network type is a private network.

* * * * *

UNITED STATES PATENT AND TRADEMARK OFFICE
CERTIFICATE OF CORRECTION

| | | |
|---|---|---|
| PATENT NO. | : 8,073,959 B2 | Page 1 of 1 |
| APPLICATION NO. | : 12/057381 | |
| DATED | : December 6, 2011 | |
| INVENTOR(S) | : Neeraj Garg et al. | |

It is certified that error appears in the above-identified patent and that said Letters Patent is hereby corrected as shown below:

In column 11, line 13, in Claim 9, delete "1," and insert -- 8, --, therefor.

In column 12, line 1, in Claim 10, delete "1," and insert -- 8, --, therefor.

In column 12, line 4, in Claim 11, delete "1," and insert -- 8, --, therefor.

In column 12, line 8, in Claim 12, delete "1," and insert -- 8, --, therefor.

In column 12, line 11, in Claim 13, delete "1," and insert -- 8, --, therefor.

Signed and Sealed this
Thirty-first Day of January, 2012

David J. Kappos
*Director of the United States Patent and Trademark Office*